(12) United States Patent
Monchiero et al.

(10) Patent No.: US 8,392,761 B2
(45) Date of Patent: Mar. 5, 2013

(54) MEMORY CHECKPOINTING USING A CO-LOCATED PROCESSOR AND SERVICE PROCESSOR

(75) Inventors: Matteo Monchiero, Palo Alto, CA (US); Naveen Muralimanohar, Santa Clara, CA (US); Partha Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

(21) Appl. No.: 12/751,005

(22) Filed: Mar. 31, 2010

(65) Prior Publication Data
US 2011/0246828 A1    Oct. 6, 2011

(51) Int. Cl.
*G06F 11/00*    (2006.01)
(52) U.S. Cl. .......................................... 714/31; 711/114
(58) Field of Classification Search ...................... 714/31
See application file for complete search history.

(56) References Cited

U.S. PATENT DOCUMENTS

| | | | |
|---|---|---|---|
| 4,912,632 A * | 3/1990 | Gach et al. ................ 710/28 |
| 6,658,594 B1 * | 12/2003 | Bui et al. ................... 714/10 |
| 6,725,396 B2 * | 4/2004 | Ahrens et al. ............. 714/10 |
| 6,792,564 B2 * | 9/2004 | Ahrens et al. ............. 714/45 |
| 6,868,479 B1 * | 3/2005 | Thibault et al. .......... 711/114 |
| 6,898,642 B2 * | 5/2005 | Chafle et al. ............. 709/248 |
| 7,065,540 B2 * | 6/2006 | Chandrasekaran et al. .. 707/674 |
| 7,296,039 B2 * | 11/2007 | Chandrasekaran et al. .. 711/119 |
| 7,756,048 B2 * | 7/2010 | Ahrens et al. ............. 370/251 |
| 7,809,933 B2 * | 10/2010 | Levitan et al. ............ 712/239 |
| 7,834,440 B2 * | 11/2010 | Ito et al. .................. 257/686 |
| 7,930,278 B2 * | 4/2011 | Chandrasekaran et al. .. 707/695 |
| 2002/0124213 A1 * | 9/2002 | Ahrens et al. ............... 714/57 |
| 2002/0152271 A1 * | 10/2002 | Chafle et al. ............. 709/204 |
| 2004/0246893 A1 * | 12/2004 | Ahrens et al. ............ 370/216 |
| 2006/0187818 A1 * | 8/2006 | Fields et al. .............. 370/216 |
| 2007/0124509 A1 * | 5/2007 | Kelley et al. .............. 710/5 |
| 2007/0234114 A1 * | 10/2007 | Bailey et al. .............. 714/13 |
| 2007/0288737 A1 * | 12/2007 | Boyle ....................... 713/1 |
| 2008/0140895 A1 * | 6/2008 | Baker et al. .............. 710/262 |
| 2008/0141350 A1 * | 6/2008 | Merkin et al. ............ 726/5 |
| 2008/0162985 A1 * | 7/2008 | Ahrens et al. .............. 714/4 |
| 2008/0195902 A1 * | 8/2008 | Astigarraga et al. ...... 714/720 |
| 2008/0235454 A1 * | 9/2008 | Duron et al. ............. 711/128 |
| 2008/0307210 A1 * | 12/2008 | Levitan et al. ........... 712/240 |
| 2009/0070214 A1 * | 3/2009 | Zhang ..................... 705/14 |
| 2009/0113194 A1 * | 4/2009 | Orita et al. ............... 713/1 |
| 2010/0078790 A1 * | 4/2010 | Ito et al. .................. 257/686 |

OTHER PUBLICATIONS

Gabriel h. Loh, 3D-stacked memory architechtures for multi-core processors, 35th ACM/IEEE international conference on computer architecture, Jun. 2008.*

* cited by examiner

*Primary Examiner* — Kamini Patel

(57) ABSTRACT

A system and method is shown that includes a processor operatively connected to a memory, the processor to include a memory controller to control access to the memory. The system and method also includes a service processor, co-located on a common board and operatively connected to the processor and the memory, the service processor to include an additional memory controller to control access to the memory as part of a checkpoint regime.

20 Claims, 12 Drawing Sheets

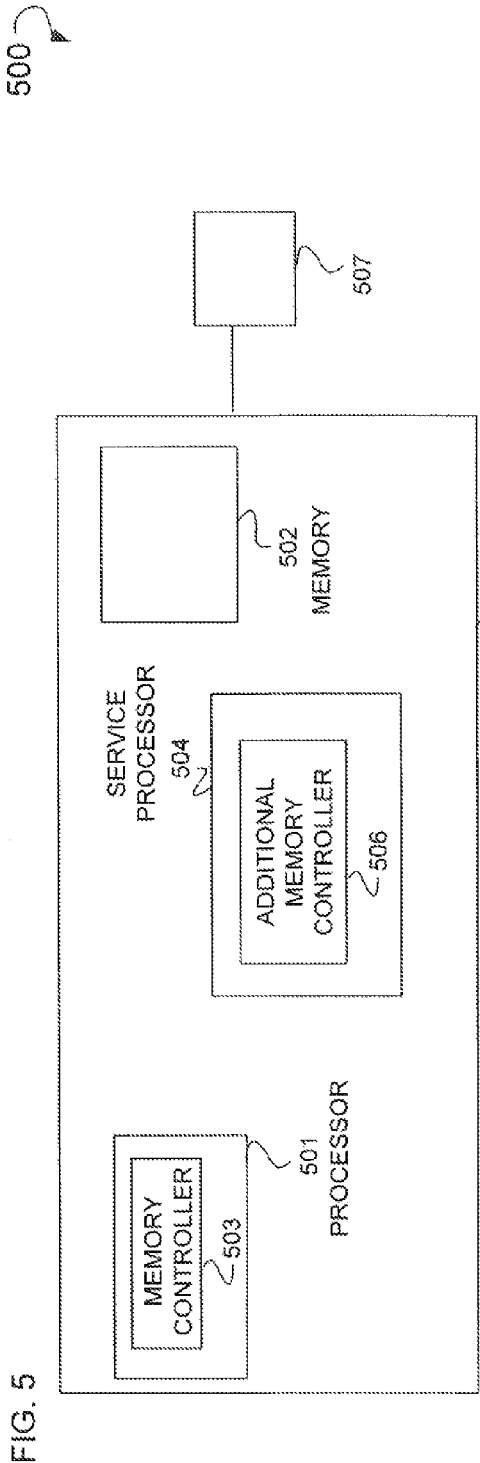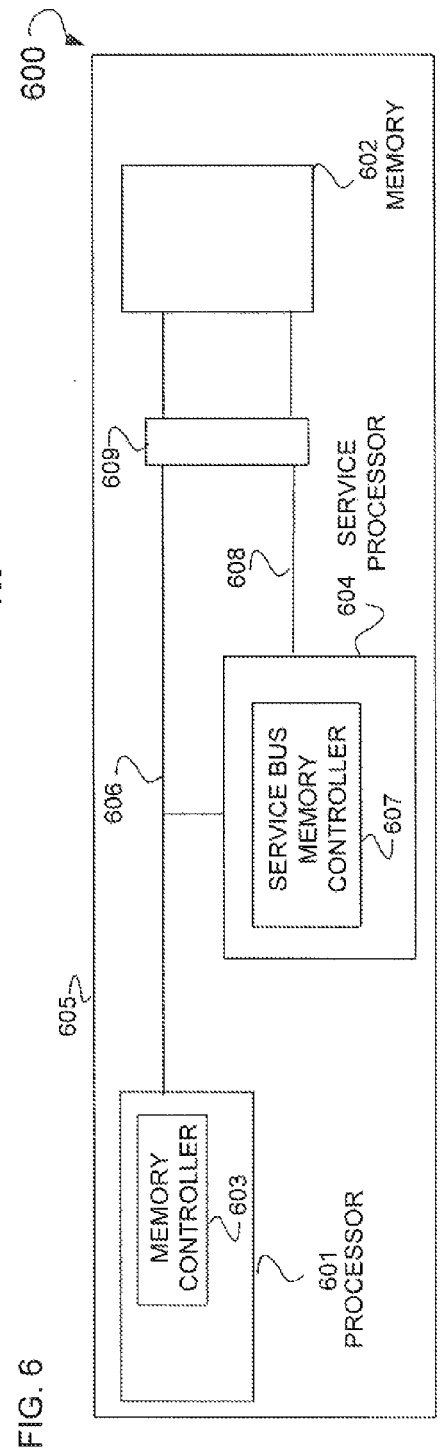

MEMORY CHECKPOINTING USING A CO-LOCATED PROCESSOR AND SERVICE PROCESSOR

BACKGROUND

Service processors are processors, or other types of integrated circuits, that are used to manage or co-manage, alongside one or more general purpose processors, specific functionality in a computer system. This functionality may include computer system diagnostics, power resource management, and remote computer system configuration and management. Some example service processors include Hewlett-Packard Company's INTEGRATED LIGHTS OUT™ (iLO) series of service processors.

BRIEF DESCRIPTION OF THE DRAWINGS

Some embodiments of the invention are described, by way of example, with respect to the following figures:

FIG. 5 is a block diagram of an apparatus, according to an example embodiment, that uses processor and service processor co-located on a common board as part of a checkpoint regime.

FIG. 6 is a block diagram of an apparatus, according to an example embodiment, with processor and service processor both operatively connected to a memory using a memory bus as part of a checkpoint regime.

DETAILED DESCRIPTION

Figure 1:
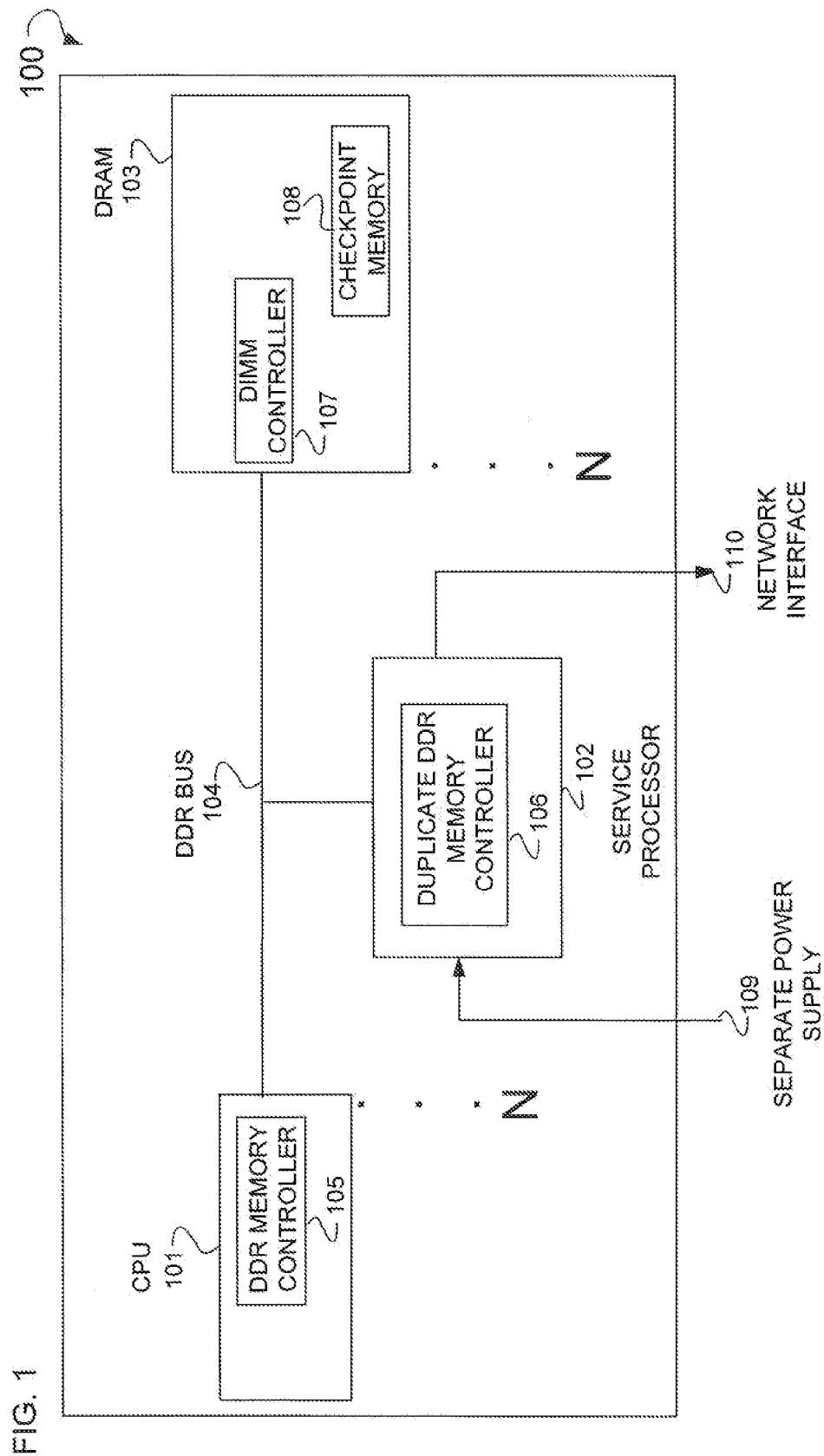
FIG. 1 is a block diagram of a system, according to an example embodiment, with a split memory bus architecture.

Illustrated is a system and method employing a local service processor with an alternative power supply, to recover memory checkpoints during computer system failures. This local service processor (i.e., a service processor) may access the memory controller of the computer system, or mimic the functionality of the memory controller to retrieve memory contents during the course of recovering memory checkpoints. A local service processor is a separate die that is located on a common socket or board with the processor. Further, as will be illustrated in more detail below, the service processor may have a power supply and network interface that is distinct from the processor that it supports. A system failure, as used herein, includes a hard failure relating the failure of a hardware component (e.g., microprocessor, memory, power supply components, etc.). The operation of taking a memory checkpoint (i.e., checkpointing) during a computer system failure includes copying a portion of memory into an area of physical memory dedicated to checkpointing.

In some example embodiments, a checkpoint regime is implemented wherein an arbiter (e.g., a checkpoint initiator such as a software application, a node, a processor, or a service processor) periodically interrupts a processor(s) to initiate a checkpoint. During this process, every node will respond to the arbiter acknowledging the receipt of the request. The arbiter can also determine the status of a node based on its response. Each processor takes a checkpoint and communicates to a service processor the location of the checkpoint. Each service processor keeps track of the most recent checkpoint taken on the processor. The service processor may notify the arbiter that a checkpoint has been taken. In cases where no notification is received from the service processor, a system failure is deemed to have occurred by the arbiter. A recovery process is initiated where a system failure occurs. The recovery process may include transferring the checkpoint data in the failed system/node to a new node. The location and size of the checkpoint is stored in the service processor. Further, the service processor may also be able to perform a memory refresh operation, a memory read operation, or a memory write operations. The service processor iterates through a number of memory addresses from the beginning to the end of the checkpoint data. Data located at these addresses may be written to an additional memory location that is accessible by an active processor or another service processor. The application in the failed system/node is then resumed in a new node using the checkpoint data.

In some example embodiments, the service processor implements a checkpoint regime wherein the service processor detects a system/node failure in the system that the service processor co-manages with a processor. The service processor may send a signal to the processor to determine whether the service processor is active (e.g., has power, or is otherwise functional). This signal may be sent on a periodic basis. If the processor is not active, the service processor initiates a recovery process by transferring the checkpoint data in the failed node to a new node. The location and size of the checkpoint is stored in the service processor. Further, the service processor may also be able to perform a memory refresh operation, a memory read operation, or a memory write operations. The service processor iterates through a number of memory addresses from the beginning to the end of the checkpoint data. Data located at these addresses may be written to an additional memory location that is accessible by an active processor or another service processor. The application in the failed node is then resumed in a new node using the checkpoint data.

In some example embodiments, the service processor implements a checkpoint regime wherein the service processor notifies an arbiter of the system failure and awaits instructions as to how to proceed. The arbiter may exist in a "wait state" awaiting a signal from the service processor servicing the failed processor or memory. Where the signal is received, a recovery process is implemented that includes the arbiter transmitting a data packet to the service processor identifying the new node that will replace the failed node. The service processor will either have a prior knowledge of the checkpoint addresses or the application will store the checkpoint location in the service processor after making a checkpoint. The service processor accesses the data associated with the start address and transmits the data to additional memory that is accessible by another active processor or service processor. This process of transmission continues until an end address is accessed. The application in the failed system/node is then resumed in a new node using the checkpoint data.

FIG. 1 is a block diagram of an example system 100 with a split memory bus architecture. Shown is at least one processor in the form a Central Processing Unit (CPU) 101 with a Double Data Rate (DDR) memory controller 105. Operatively connecting the CPU 101, and the DDR memory controller 105 to a Dynamic Random Access Memory (DRAM) 103 is a DDR bus 104. The DRAM 103 includes a Dual Inline Memory Module (DIMM) controller 107 checkpoint memory 108. In cases where the DDR bus 104 is implemented data latency and power issues may exist due to the sharing of the DDR bus 104 between the service processor 102 and the CPU 101. A plurality of DRAM 103 may be implemented as part of the system 100. Other types of other non-volatile memories may be used in lieu of the DRAM 103. These other types of non-volatile memories may include flash, Magnetoresistive Random Access Memory (MRAM), Phase-Change Random Access Memory (PCRAM) memories, Memristors, or some other suitable type of memory. In some example embodiments, the checkpoint memory 108 is a distinct piece of physical memory. By contrast, in some cases, the checkpoint memory 108 is a partitioned piece of memory that is logically, but not physically, distinct. Further, software may be used to find a checkpoint, and store the location (e.g., as a pointer) of the checkpoint on the service processor 102. In some example embodiments, the location is found using the software and pushed to an arbiter. As illustrated, the DDR bus 104 is split such that it is shared between the DRAM 103, and a service processor 102. In some example embodiments, a split optical interconnect is used in lieu of the DDR bus 104. Residing as part of the service processor 102, is a DDR memory controller 106 that has some or all of the functionality of the DDR memory controller 105. This functionality includes the ability to perform a memory refresh operation, a memory read operation, or a memory write operation. Also shown is a separate power supply 109 that provides electrical power to the service processor 102. Further, a network interface 110 is illustrated that allows the service processor 102 to execute the above referenced functionality. For example, the network interlace 110 is used to transmit data retrieved from the DRAM 103 during the execution of a checkpointing regime.

Figure 2:
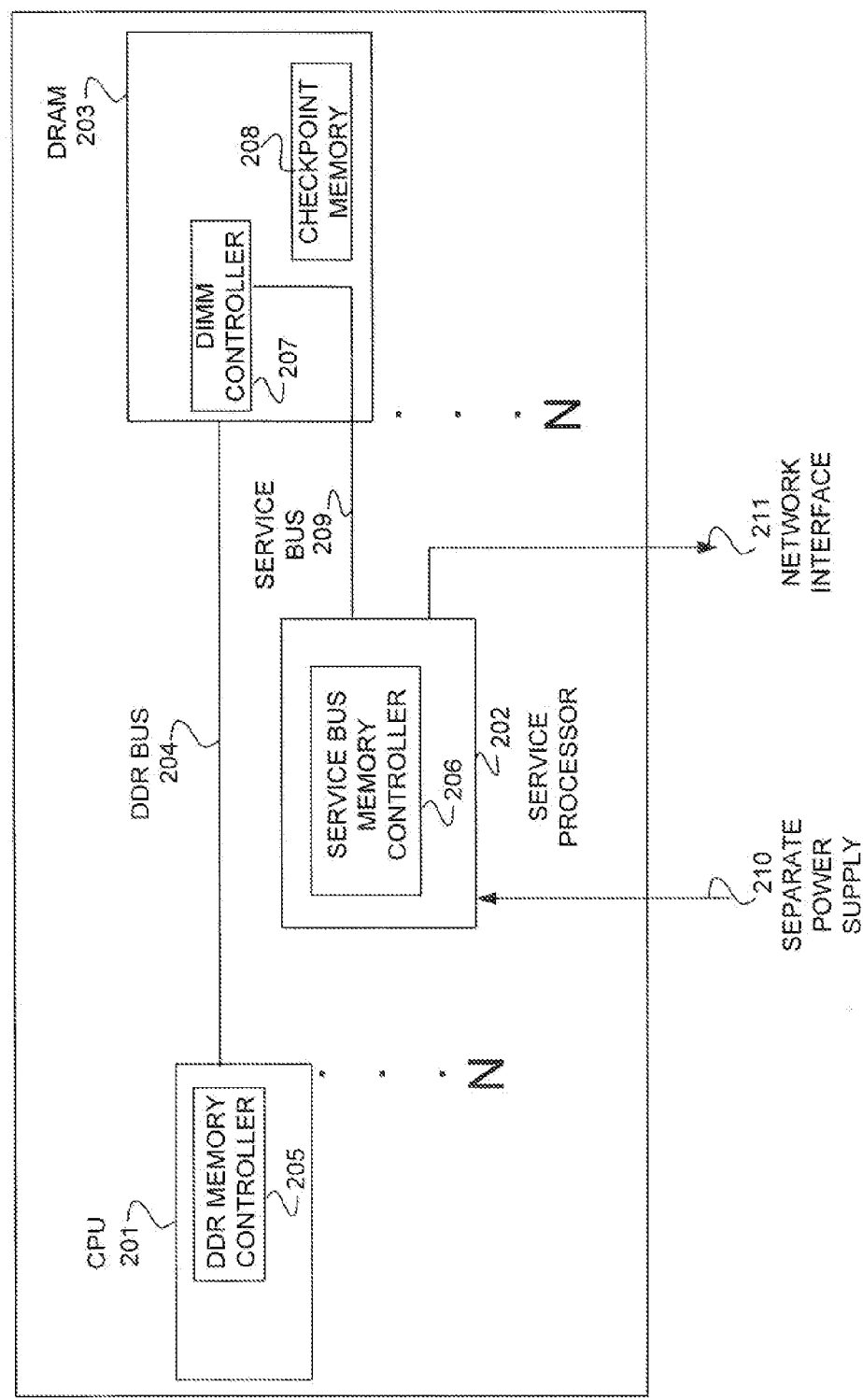
FIG. 2 is a block diagram of a system, according to an example embodiment, with a service memory bus architecture.

FIG. 2 is a block diagram of an example system 200 with a service memory bus architecture. Shown is at least one processor in the form a CPU 201 with a DDR memory controller 205. Operatively connecting the CPU 201 and the DDR memory controller 205 to a DRAM 203 is a DDR bus 204. The DRAM 203 includes a DIMM controller 207 and a checkpoint memory 208 used to store checkpoint data. A plurality of DRAM 203 may be implemented as part of the system 200. Other types of other non-volatile memories may be used in lieu of the DRAM 203. These other types of non-volatile memories may include flash, MRAM, PCRAM memories, Memristors, or some other suitable type of memory. In some example embodiments, an optical interconnect is used in lieu of the DDR bus 204. In some example embodiments, the checkpoint memory 208 is a distinct piece of physical memory. By contrast, in some cases, the checkpoint memory 208 is a partitioned piece of memory that is logically, but not physically, distinct. Further, software may be used to update the service processor with the checkpoint location. Residing as part of the service processor 202 is a DDR memory controller 206 that has some or all of the functionality of the DDR memory controller 205. This functionality includes the ability to perform a memory refresh operation, a memory read operation, or a memory write operation. Also shown is a separate power supply 210 that provides electrical power to the service processor 202. Further, a network interface 211 is illustrated that allows the service processor 202 to execute the above referenced functionality. For example, the network interface 211 is used to transmit data retrieved from the DRAM 203 when recovering from a failure. Also shown is a service bus 209 that operatively connects the service processor 202 to the DRAM 203. This service bus 209 directly connects the service bus memory controller 206 to the DIMM controller 207. Through the use of the service bus 209, the DDR bus 204 can transfer data at a faster rate as compared to the split memory bus architecture of FIG. 1. In some example embodiments, an optical interconnect is used in lieu of the service bus 209. The service bus 209 may have a higher cost in implement due to extra pins, yet may have lower data latency and power requirements as compared to the DDR bus 104 and the system 100.

Figure 3:
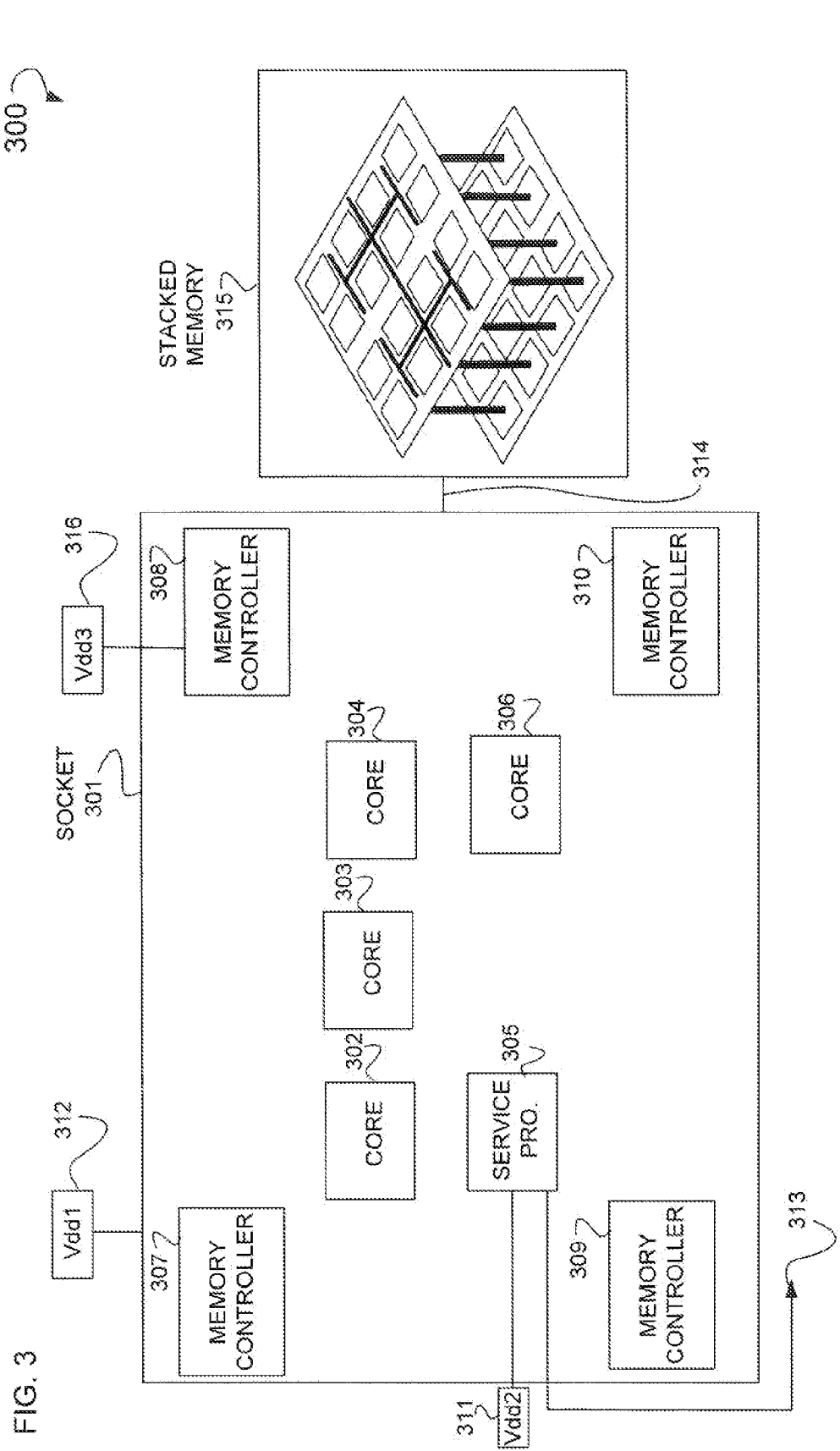
FIG. 3 is a block diagram of a system, according to an example embodiment, with a service processor used as part of a three dimensional (3D) stacked memory architecture.

FIG. 3 is a block diagram of an example system 300 with a service processor used as part of a 3D stacked memory architecture. A 3D stacked memory architecture may include horizontally integrated memory that is integrated through the use of plurality of interconnects (e.g., a broadcast bus, or H-tree interconnect). Further, the 3D stacked memory architecture may include vertically integrated memory that is integrated through the use of Through Silicon Vias (TSVs). The stacked memory can either be homogeneous or heterogeneous. Shown is a socket 301 that includes a plurality of cores 302-304, and 306. Additionally, a plurality of memory controllers 307-310 is also shown. Additional cores and memory controllers may be implemented. Further, these core and memory controllers may be implemented in a one to one, or one to many organization. Power is supplied to the cores 302-304 and 306 via a power source 312 (referenced as a "Vdd1"). Also shown is a service processor 305 that receives electrical power from a separate power source 311 (referenced as a "Vdd2"). Additionally, a memory controller 308 is shown that may receive electrical power from a separate power source 316 (referenced as a "Vdd3"). The service processor 305 includes a memory controller that mimics the functionality of the memory controllers 307-310. In one example embodiment, the service processor 305 directly communicates with the stacked memory 315 using its own memory controller to access checkpoint memory. Further, in another example embodiment, the service processor 305 communicates with the stacked memory 315 using the memory controller 308, and can access checkpoint memory that resides as part of the stacked memory 315. A bus 314 operatively connects the socket 301 to a stacked memory 315. An optical interconnect may be used in lieu of the bus 314. Non-volatile memories used as part of the stacked memory 315 may include DRAM, flash, MRAM, PC RAM memories, Memristors, or some other suitable type of memory. Additionally, a network interface 313 is used by the service processor 305 to transmit data retrieved from the stacked memory 315 during the execution of a checkpointing regime.

Figure 4:
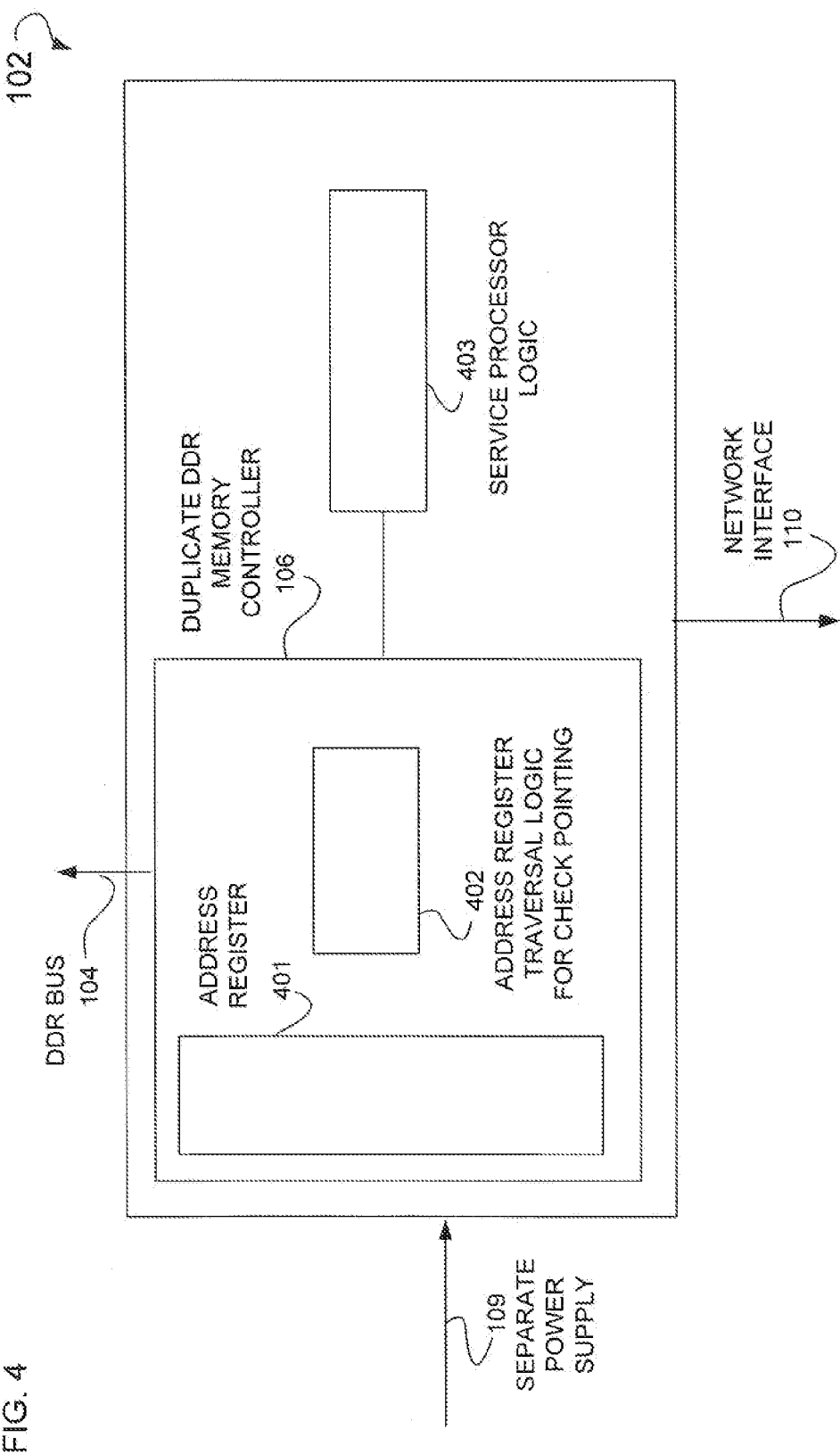
FIG. 4 is a block diagram of the service processor, according to an example embodiment.

FIG. 4 is a block diagram of the example service processor 102. Shown is an address register 401 that includes a start and end addresses of the checkpoint data. These addresses may be received from the arbiter, processor, or memory controller that is requesting that checkpointing be performed. Also shown is address register traversal logic 402 (e.g., a simple counter) that generates addresses to retrieve checkpoint data. Both the address register 401 and the address register traversal logic 402 reside as part of the duplicate DDR memory controller 106. In some example embodiments, the address register 401 and the address register traversal logic 402 reside as part of the service bus memory controller 206 where the service processor 202 is implemented. Also shown is the service processor logic 403. This service processor logic 403 may include logic necessary to determine whether a processor is active. FIG. 5 is a block diagram of an apparatus 500 that uses processor and service processor co-located on a common board as part of a checkpoint regime. Shown is a processor 501 operatively connected to a memory 502, the processor 501 to include a memory controller 503 to control access to the memory 502. Also shown is service processor 504, co-located on a common board 505 and operatively connected to the processor 501 and the memory 502, the service processor 504 to include an additional memory controller 506 to control access to the memory 502 as part of a checkpoint regime. Operatively connected includes a logical or physical connection. In some example embodiments, each of the memory controller 503 and the additional memory controller 506 have common functionality. The common functionality includes at least one of a memory refresh operation, a memory read operation, or a memory write operation. The service processor 504 includes a network interface and power supply that are distinct from that of the common board 505. In some example embodiments, the checkpoint regime includes an arbiter 507 to transmit an interrupt to the apparatus, the interrupt to prompt the apparatus to send a responsive message to the arbiter 507. Further, in some example embodiments, the checkpoint regime includes the service processor to transmit an interrupt to the processor, the interrupt to prompt the processor to send a responsive message to the service processor. Additionally, the service processor may fetch a checkpoint with the additional memory controller, the checkpoint fetched where a system failure is detected by the service processor.

FIG. 6 is a block diagram of an example apparatus 600 with processor and service processor both operatively connected to a memory using a memory bus as part of a checkpoint regime. Shown is a processor 601 operatively connected to a memory 602, the processor 601 to include a memory controller 603 to control access to the memory 602. A service processor 604, co-located on a common board with the processor 601 and operatively connected to the memory 602 via a bus 606, the service processor to use the bus 606 to access to the memory 602 as part of a checkpoint regime. In some example embodiments, the bus 606 is a split bus that operatively connects the service processor 604 and the memory 602. In some example embodiments, a service bus 608 operatively connects the service processor 604 and the memory 602. The service processor 604 may include a network interface and power supply that is distinct from that of the common board 605. An optical interconnect may be used in lieu of the bus 606 to operatively connect the service processor 604 and the memory 602. A security module 609 is operatively connected to the processor 601 to authenticate the service processor 604. Authentication may take the form of symmetric or asymmetric key based authentication. This security module 609 may be optionally implemented as part of the system 600. The service bus memory controller 607 may include some of the functionality of the memory controller 603. The checkpoint regime includes the service processor 604 to copy a checkpoint to an additional apparatus where a system failure is detected.

Figure 7:
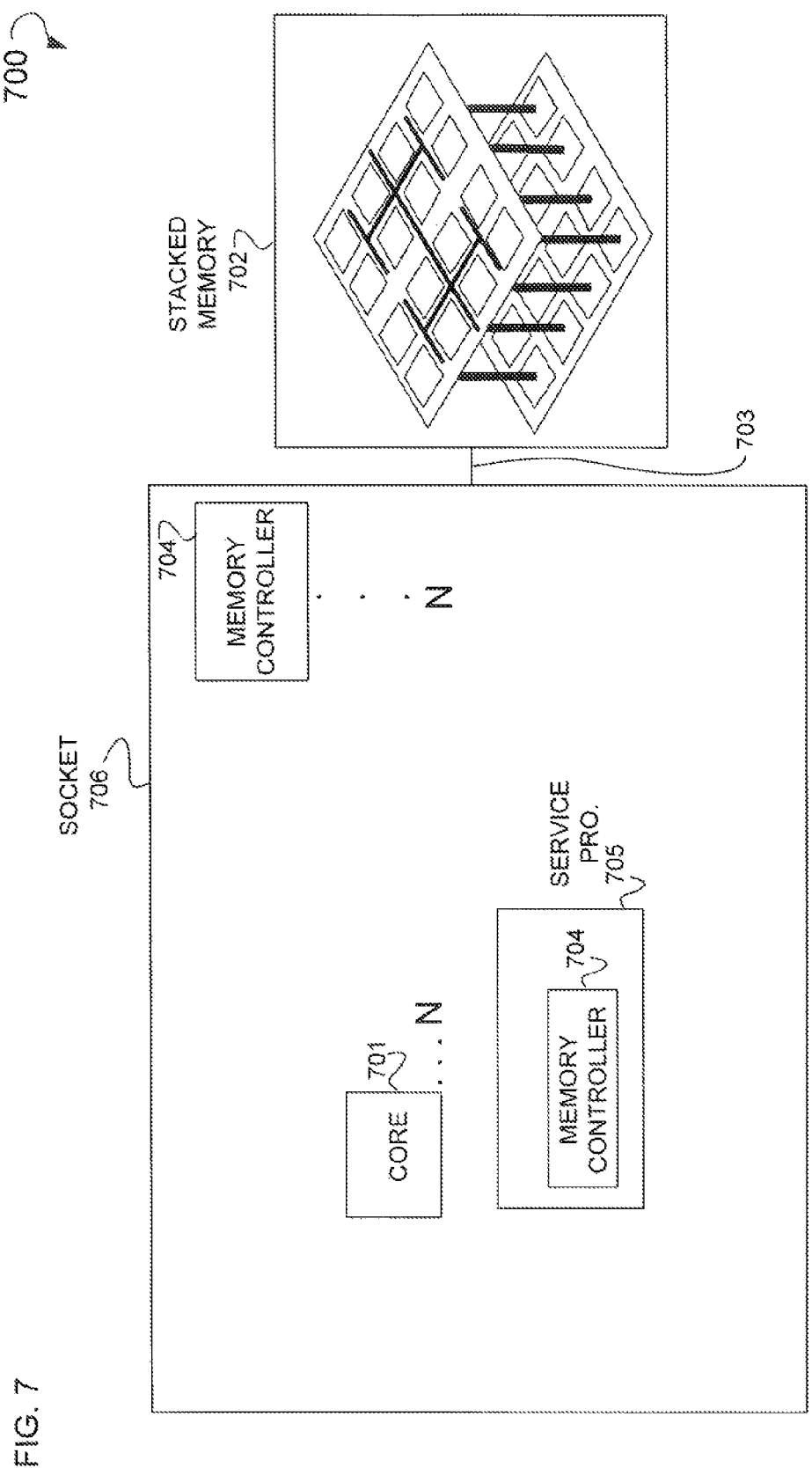
FIG. 7 is a block diagram of an apparatus, according to an example embodiment, with a processor(s) and service processor operatively connected to a 3D stacked memory as part of a checkpoint regime.

FIG. 7 is a block diagram of an example apparatus 700 with a processor(s) and service processor operatively connected to a 3D stacked memory as part of a checkpoint regime. Shown is at least one processor 701 connected to a 3D stacked memory 702 to transfer data via one or more memory controllers 704. Also shown is a service processor 705, co-located on a common socket 706 with at least one processor 701, connected to the 3D stacked memory 702 via TSVs, the service processor 705 to include a memory controller 704 to control access to the 3D stacked memory 702 as part of a checkpoint regime. In some example embodiments, the service processor 705 includes a network interface and power supply that are distinct from that of the common socket 706. In some example embodiments, the 3D stack memory 702 includes memory cells connected via interconnects and Through Silicon Vias (TSVs). The service processor 705 may detects a system failure, and retrieves a memory checkpoint from the 3D stacked memory 702 as part of the checkpoint regime. In some example embodiments, the service processor 705 detects the system failure where the service processor fails to receive a response to an interrupt transmitted to the at least one processor 701. In some example embodiments, the at least one processor is connected to the three dimensional (3D) stacked memory by a connection 703 that includes at least one of a bus or the TSVs.

Figure 8:
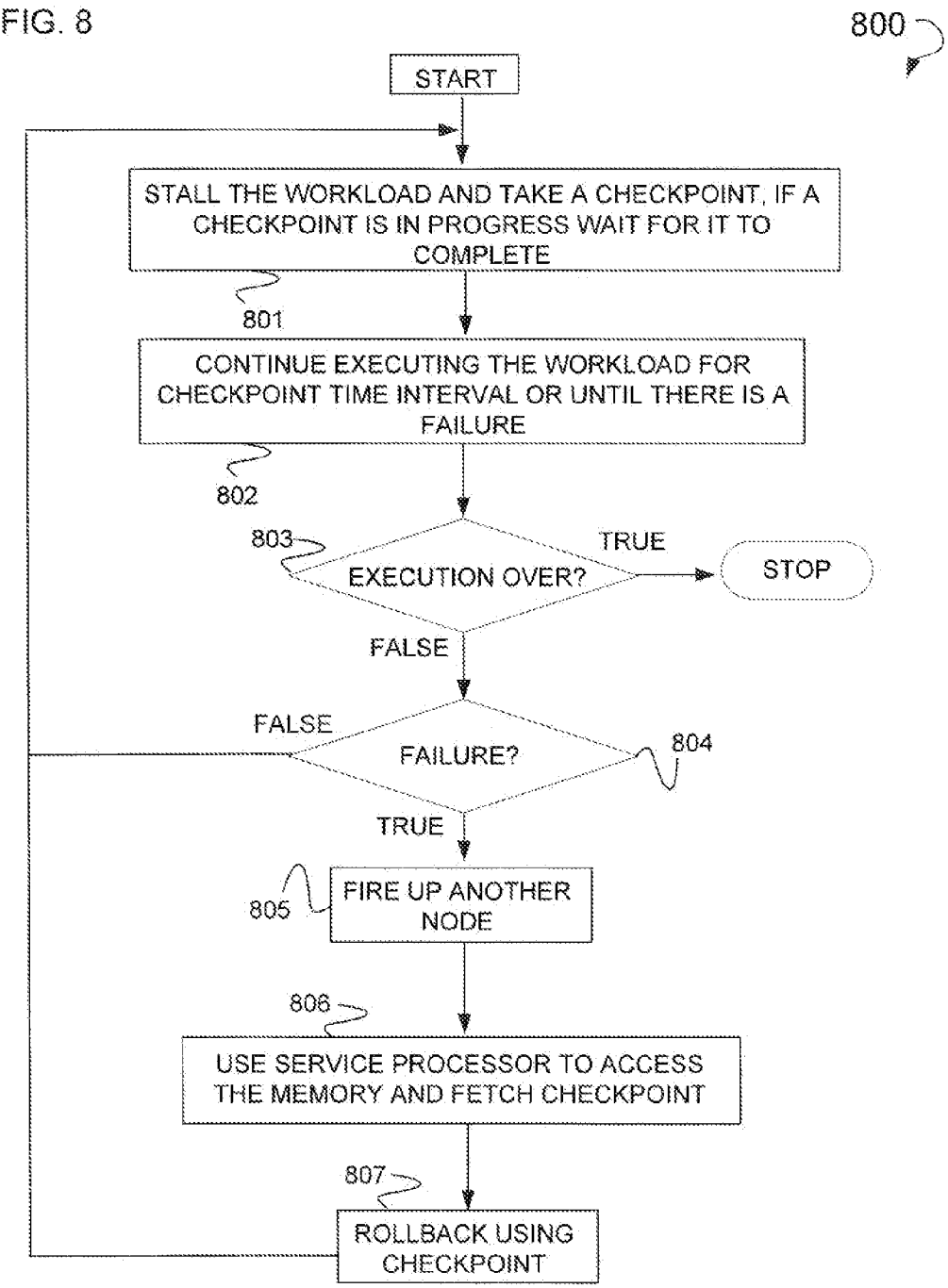
FIG. 8 is a flow chart illustrating a method, according to an example embodiment, executed to implement a checkpoint regime using a service processor to access memory to recover from a failure.

FIG. 8 is a flow chart illustrating an example method 800 executed to implement a checkpoint regime using a service processor to access memory to recover from a failure. Operation 801 is executed to stall a workload and take a checkpoint, or if a checkpoint is in progress to wait for the checkpoint to complete. A workload may be an execution thread generated by an application attempting to access the memory that is to be backed up using checkpointing. This operation 801 may be executed by the service processors 102, 202, or 314. Operation 802 is executed to continue to execute the workload for a checkpoint time interval or until there is a failure. This operation 802 may be executed by the service processors 102, 202, or 314, or an additional processor, service processor, or memory controller located remotely from the service processor 102. A decision operation 803 is executed to determine whether the execution of the workload has completed. In cases where decision operation 803 evaluates to "true" a termination operation is executed ending the method 800. In cases where decision operation 803 evaluates to "false" a further decision operation 804 is executed. Decision operation 803 may be executed by the service processors 102, 202, or 314. Decision operation 804 is executed to determine whether a failure has occurred. A failure may be a hard failure of a CPU co-located with the service processor 102. In cases where decision operation 804 evaluates to "false," the operation 801 is re-executed. In cases where decision operation 804 evaluates to "true," operation 805 is executed. Decision operation 804 may be executed by an arbiter, or the service processors 102, 202, or 314. Operation 805 is executed by an arbiter to fire up (i.e. boot up, or otherwise initiate) another node. The execution of operation 805 may include the arbiter receiving a signal from a service processor notifying the arbiter that a failure of a CPU has occurred. Operation 806 is executed to use the service processor 102, 202, or 314 to access memory and fetch a checkpoint. This operation 806 may be executed by the service processors 102, 202, or 314. Operation 807 is executed by the service processors 102, 202, or 314 to execute a checkpoint roll back to access memory for the purposes of implementing a checkpoint regime. Operation 807 may be executed as part of the address register traversal logic 402.

Figure 9:
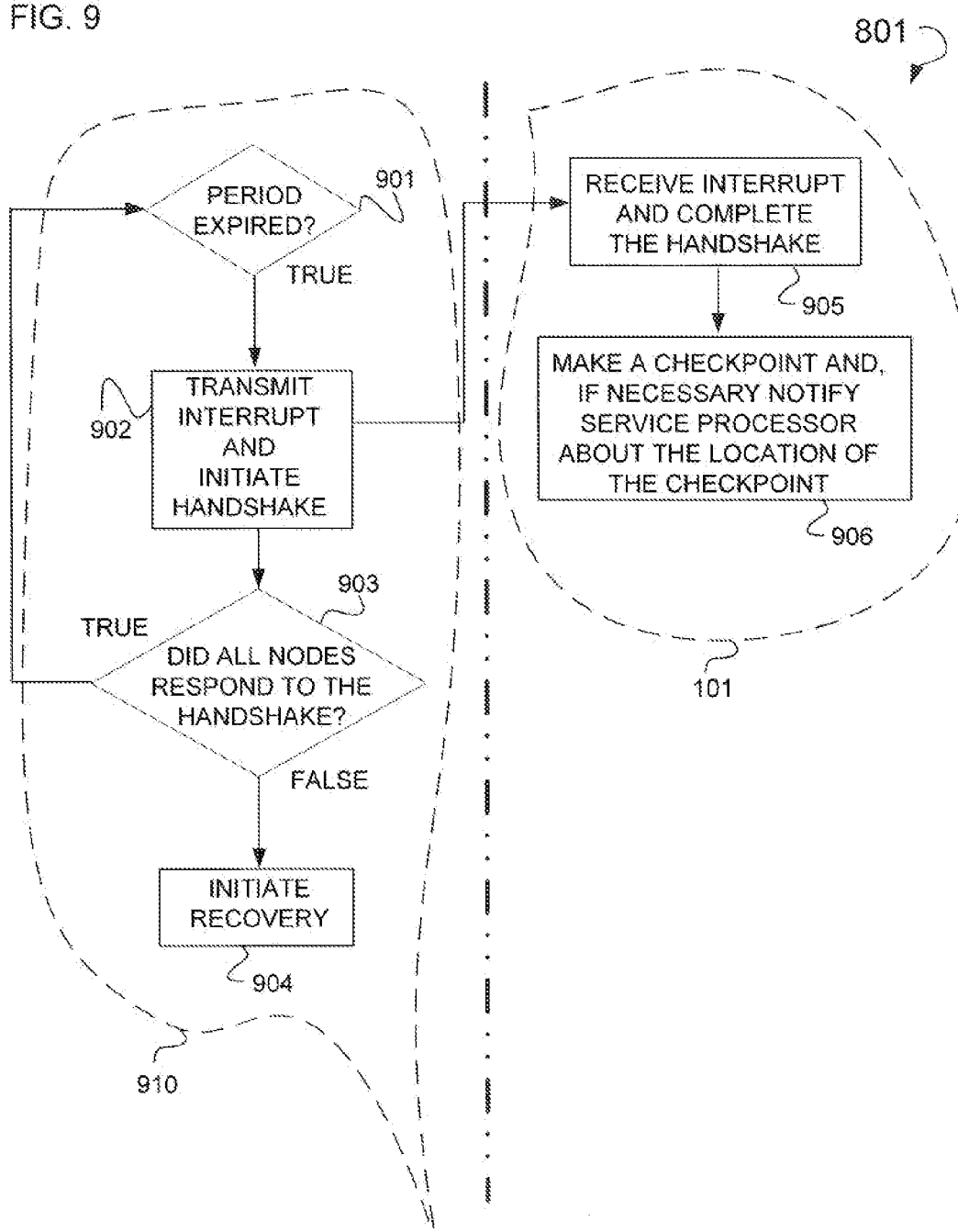
FIG. 9 is a dual-stream flow chart illustrating a execution of an operation, according to an example embodiment; to stall a computer system workload and take a checkpoint, and if a checkpoint is in progress to wait for it to complete.

FIG. 9 is a dual-stream flow chart illustrating an example execution of operation 801. Shown is the execution of an operation 801 executed to stall a computer system workload and take a checkpoint, and if a checkpoint is in progress to wait for it to complete. Illustrated are operations 901-904 that may be executed by an arbiter 910. Also shown are operations 905-906 that may be executed by the CPU 101. Decision operation 901 is executed to determine whether a predefined period has expired upon the expiration of which a checkpoint it to be retrieved. In cases where decision operation 901 evaluates to "true," an operation 902 is executed. Operation 902 is executed to transmit an interrupt to stall a workload to take an interrupt, and to initiate a session, via a handshake operation, with the CPU 101. Decision operation 903 is executed to determine whether all nodes (e.g., CPUs) responded to the handshake operation. In some example cases, the arbiter 910 initiates a session with some of the nodes as opposed to all of the nodes. In cases where decision operation 903 evaluates to "true," decision operation 901 is re-executed. In cases where decision operation 903 evaluates to "false," operation 904 is executed to initiate a recovery through the execution of operations 805-807, or method 1300. Operation 905 is executed to receive an interrupt and complete a handshake. Operation 906 is executed to make a checkpoint and notify service processor(s) about the location of the checkpoint. Notification may take the form of passing a pointer to the checkpoint to the service processor(s).

Figure 10:
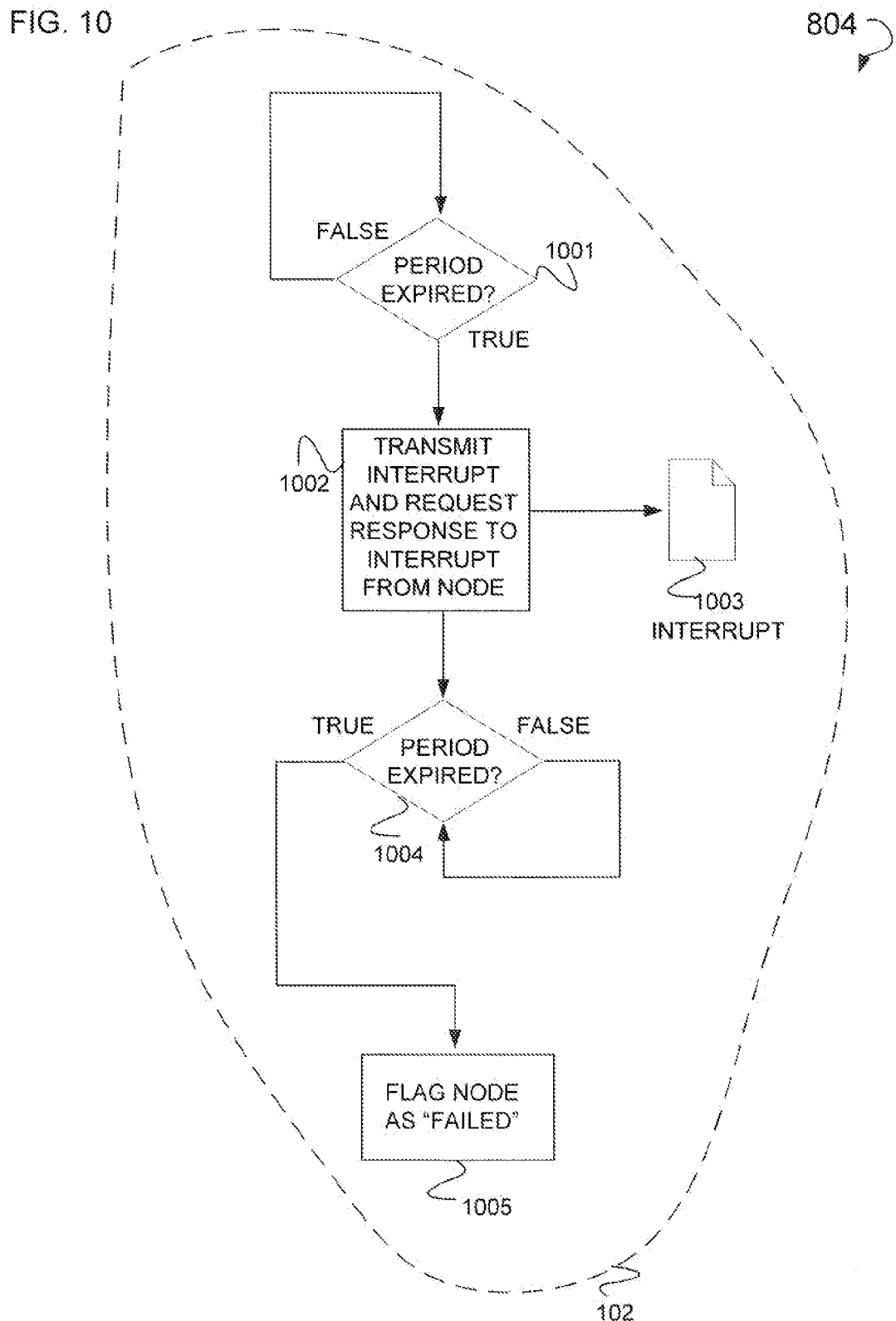
FIG. 10 is a flow chart illustrating the execution of an operation, according to an example embodiment, to detect system failure.

FIG. 10 is a flow chart illustrating the execution of an example operation 804. Shown is the execution of an operation 804 executed to detect system failure. Operations 1001-1005 may be executed by the arbiter 910. In some example cases, the operations 1001-1005 are executed by the service processor 102. A decision operation 1001 is executed to determine whether a period has expired. This period may be a time upon the expiration of which system activity may be determined. In cases where the decision operation 1001 evaluates to "false." the period has not expired and decision operation 1001 is re-executed. In cases where the decision operation 1001 evaluates to "true," the operation 1002 is executed. Operation 1002 transmits an interrupt and response request 1003 to a node. A decision operation 1004 is executed to determine whether the time period for a response to the interrupt and response request 1003 has expired. In cases where decision operation 1004 evaluates to "false," the time period for response has not expired and the decision operation 1004 is re-executed. In cases where the decision operation 1004 evaluates to "true," an operation 1005 is executed. Operation 1005 is executed to flag a node as "failed," the to return a "fail" value.

Figure 11:
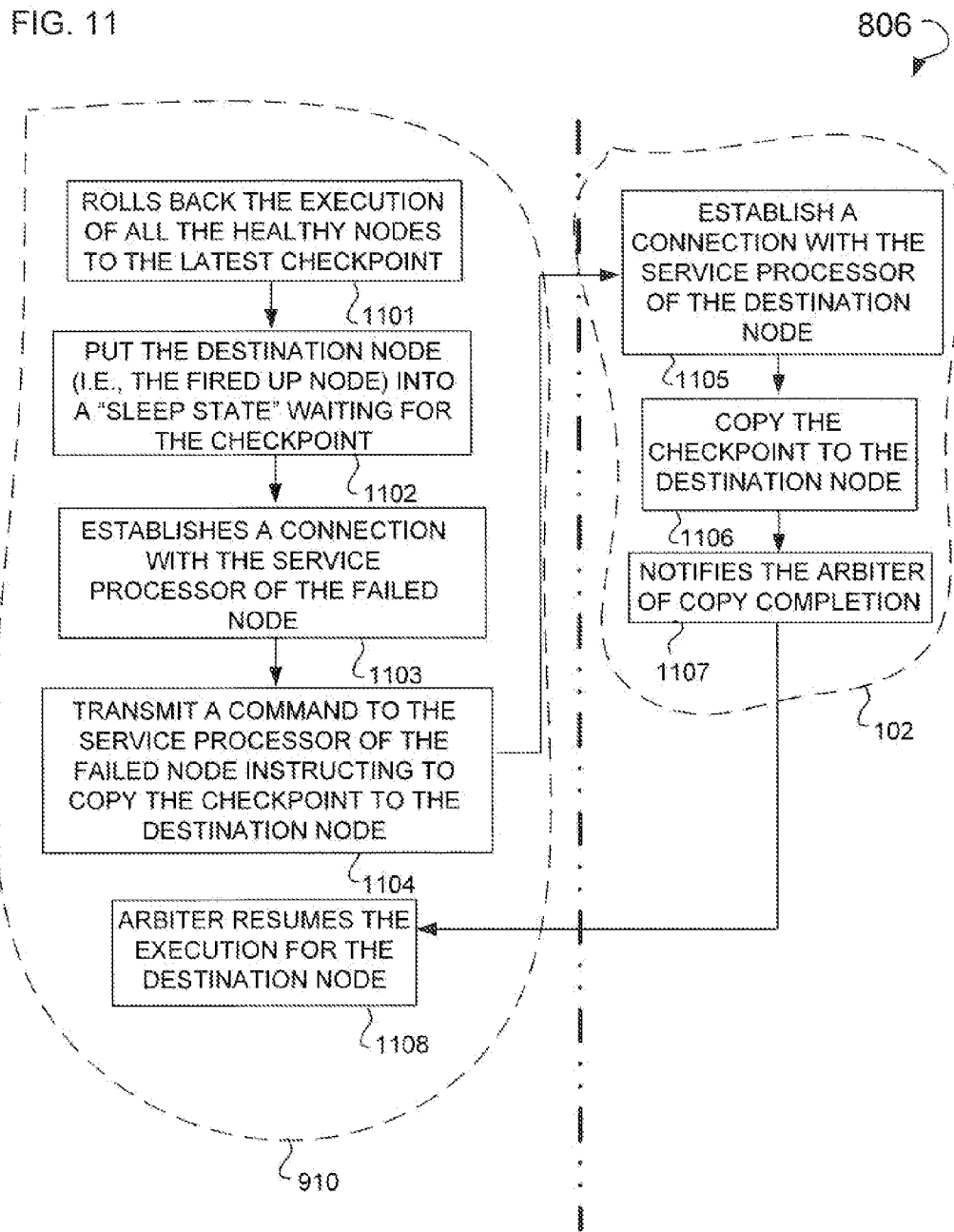
FIG. 11 is a dual-stream flow chart illustrating the execution of an operation, according to an example embodiment, to implement a checkpoint regime through using a service processor to access the memory and fetch checkpoint.

FIG. 11 is a dual-stream flow chart illustrating the example execution of an operation 806. Operation 806 is executed to implement a checkpoint regime through using a service processor to access the memory and fetch checkpoint. Shown are operations 1101-1104 and 1108 that are executed by the arbiter 910. Also shown are operations 1105-1107 that are executed by the service processor 102. Operation 1101 is executed to roll back the execution of all healthy nodes to the latest checkpoint. Operation 1102 is executed to put a destination node into a "sleep state," where the destination node is the node that is fired up through the execution of operation 805. This node is placed into the sleep state to allow it to wait for the checkpoint. Operation 1103 is executed to establish a connection with the service processor of the failed node. Operation 1104 is executed to transmit a command to the service processor of the failed system/node instructing the service processor to copy the checkpoint to the destination node. Operation 1105 is executed to establish a connection with the service processor of the destination node. Operation 1106 is executed to copy the checkpoint to the destination node. Operation 1107 is executed to notify the arbiter of the completion of the copying of the checkpoint. Operation 1108 is executed to allow the arbiter to resume execution for the destination node, and the application(s) associated therewith.

Figure 12:
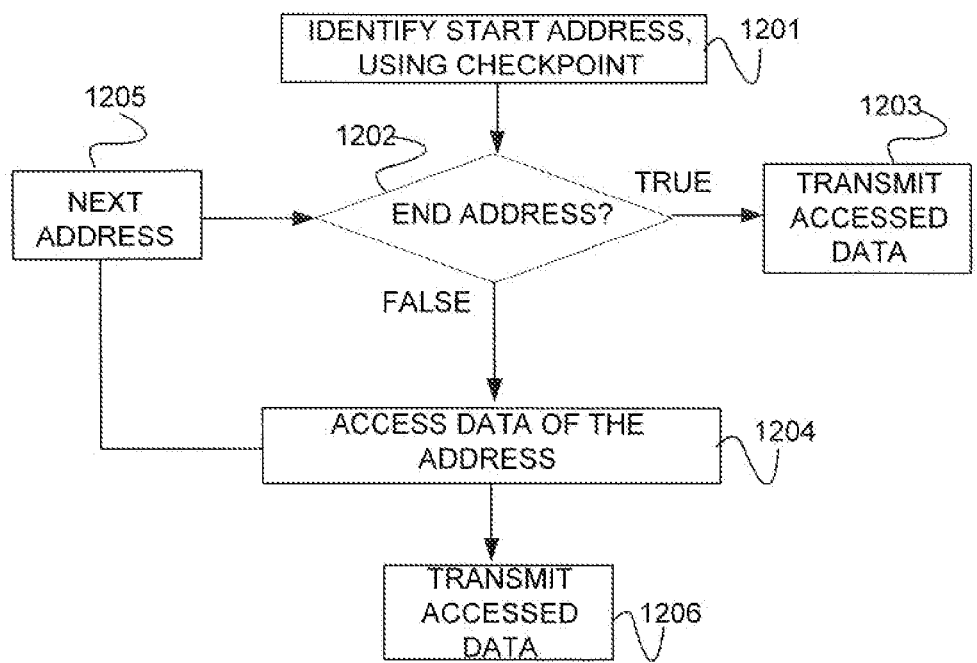
FIG. 12 is a flow chart illustrating the execution of an operation, according to an example embodiment, to copy the checkpoint to the destination node.

FIG. 12 is a flow chart illustrating the execution of an example operation 1106. Operation 1201 is executed to identify a start address for a checkpointing regime. Decision operation 1202 is executed to identify an end address for the checkpointing regime. In cases where decision operation 1202 evaluates to "true," an operation 1203 is executed. In cases where decision operation 1202 evaluates to "false," an operation 1204 is executed. Operation 1203 is executed to transmit accessed data (e.g., read data) to an arbiter, processor, service processor, or memory controller located remotely from the service processor executing the operation 1204. Operation 1204 is executed to access (e.g., read data) the data associated with the address. Operation 1205 is executed to find the next address for memory to be accessed as part of a checkpoint regime. The next address may be the next address in physical memory, and as such the operation 1205 may increment a numeric value representing an address in memory. Operation 1206 is executed to transmit accessed data (e.g., read data) to another processor, service processor, or memory controller located remotely from the service processor executing the operation 1206.

Figure 13:
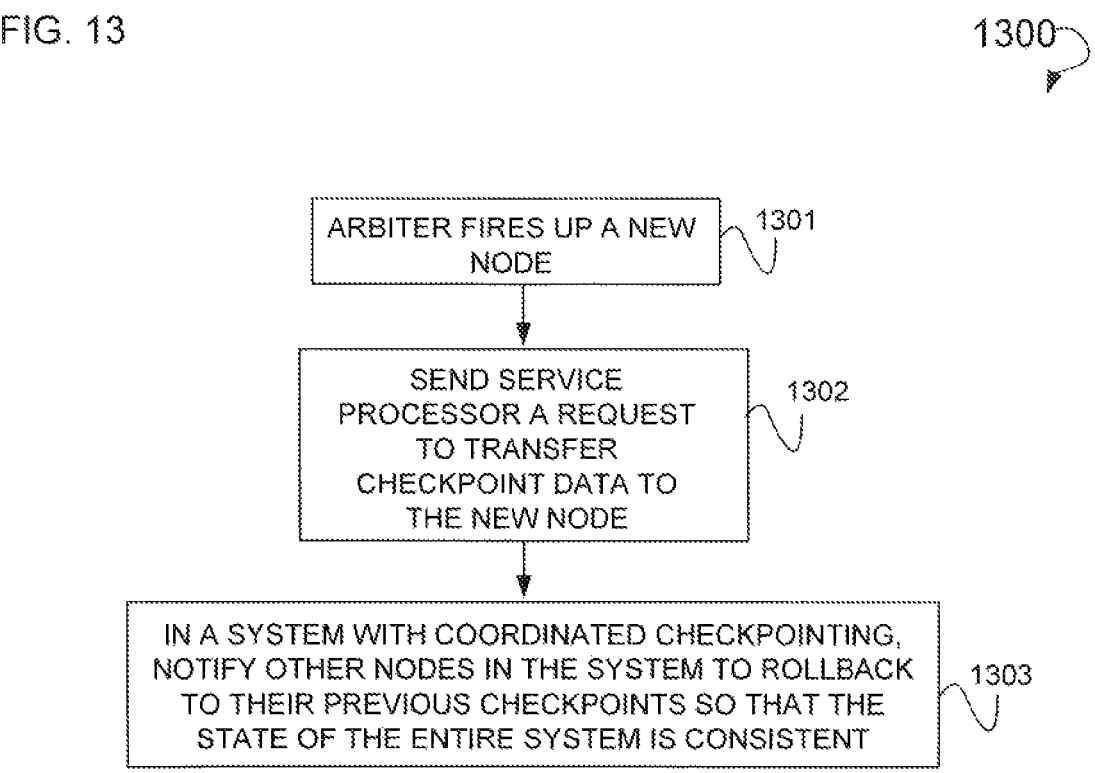
FIG. 13 is a flow chart illustrating the execution of a method, according to an example embodiment, used to initiate a rollback operation.

FIG. 13 is a flow chart illustrating the execution of a method 1300 used to initiate a rollback operation. Shown are operations 1301-1303 that are executed by the arbiter 910. These operations 1301-1303 may be executed in lieu of the operations 805-807. Operation 1301 is executed to fire up, or otherwise activate a node (e.g., a new node). Operation 1302 is executed to send a service processor a request to transfer checkpoint data to the activated node. Operation 1303 is executed to, in a system with coordinated checkpointing, notify other nodes in the system to rollback to their previous checkpoints so that the state of the entire system is consistent. The state of the entire system includes all the nodes in the system utilizing a common checkpoint or series of checkpoints.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the methods illustrated herein are stored as data and instructions (of the software) in storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations there from. It is intended that the appended claims cover such modifications and variations as fall within the "true" spirit and scope of the invention.

What is claimed is:

1. An apparatus comprising:
a processor operatively connected to a memory, the processor to include a memory controller to control access to the memory; and
a service processor, co-located on a common board and operatively connected to the processor and the memory, the service processor to include an additional memory controller to control access to the memory as part of a checkpoint regime that utilizes the service processor to periodically transmit a first interrupt to the processor, to activate a first node, to transfer checkpoint data to the first node, and to instruct a second node to rollback to a previous checkpoint to ensure the first node and the second node are utilizing a common checkpoint,
wherein the first interrupt includes the processor receiving a checkpoint and the processor communicating the location of the checkpoint to the service processor.

2. The apparatus of claim 1, wherein each of the memory controller and the additional memory controller have common functionality.

3. The apparatus of claim 2, wherein the common functionality includes at least one of a memory refresh operation, a memory read operation, or a memory write operation.

4. The apparatus of claim 1, wherein the service processor includes a network interface and power supply that are distinct from that of the common board.

5. The apparatus of claim 1, wherein the checkpoint regime includes an arbiter to transmit a second interrupt to the apparatus, the second interrupt to prompt the apparatus to send a responsive message to the arbiter.

6. The apparatus of claim 1, wherein the first interrupt prompts the processor to send a responsive message to the service processor.

7. The apparatus of claim 1, wherein the service processor fetches the checkpoint with the additional memory controller, the checkpoint fetched where a system failure is detected by the service processor.

8. An apparatus comprising:
a processor operatively connected to a memory, the processor to include a memory controller to control access to the memory; and
a service processor, co-located on a common board with the processor and operatively connected to the memory via a bus, the service processor to use the bus to access the memory as part of a checkpoint regime that utilizes the service processor to periodically transmit an interrupt to the processor, to activate a first node, to transfer checkpoint data to the first node, and to instruct a second node to rollback to a previous checkpoint to ensure the first node and the second node are utilizing a common checkpoint,
wherein the interrupt includes the processor receiving a checkpoint and the processor communicating the location of the checkpoint to the service processor.

9. The apparatus of claim 8, wherein the bus is a split bus that operatively connects the service processor and the memory.

10. The apparatus of claim 8, further comprising a service bus that operatively connects the service processor and the memory.

11. The apparatus of claim 8, wherein the service processor includes a network interface and power supply that are distinct from that of the common board.

12. The apparatus of claim 8, further comprising a security module to authenticate the service processor.

13. The apparatus of claim 8, further comprising a service bus memory controller that includes some of the functionality of the memory controller to control access to the memory.

14. The apparatus of claim 8, wherein the checkpoint regime includes the service processor to copy the checkpoint to an additional apparatus where a system failure is detected.

15. An apparatus comprising:
at least one processor connected to a three dimensional (3D) stacked memory to transfer data via one or more memory controllers; and
a service processor, co-located on a common socket with at least one processor, connected to the 3D stacked memory via Through Silicon Vias (TSVs), the service processor to include a memory controller to control access to the 3D stacked memory as part of a checkpoint regime that utilizes the service processor to: periodically transmit an interrupt to the processor, to activate a first node, to transfer checkpoint data to the first node, and to instruct a second node to rollback to a previous checkpoint to ensure the first node and the second node are utilizing a common checkpoint,
wherein the interrupt includes the processor receiving a checkpoint and the processor communicating the location of the checkpoint to the service processor.

16. The apparatus of claim 15, wherein the service processor includes a network interface and power supply that are distinct from that of the common socket.

17. The apparatus of claim 15, wherein the 3D stack memory includes memory cells connected via interconnects and the TSVs.

18. The apparatus of claim 15, wherein the service processor:
detects a system failure; and
retrieves the checkpoint from the 3D stacked memory as part of the checkpoint regime.

19. The apparatus of claim 18, wherein the service processor detects the system failure where the service processor fails to receive a response to the interrupt transmitted to at least one processor.

20. The apparatus of claim 15, wherein the at least one processor is connected to the 3D stacked memory by a connection that includes at least one of a bus or the TSVs.

* * * * *

UNITED STATES PATENT AND TRADEMARK OFFICE
CERTIFICATE OF CORRECTION

PATENT NO. : 8,392,761 B2
APPLICATION NO. : 12/751005
DATED : March 5, 2013
INVENTOR(S) : Matteo Monchiero et al.

Page 1 of 1

It is certified that error appears in the above-identified patent and that said Letters Patent is hereby corrected as shown below:

In the Claims:

In column 9, line 28, in Claim 1, delete "to" and insert -- to: --, therefor.

In column 10, line 1, in Claim 8, delete "to" and insert -- to: --, therefor.

Signed and Sealed this
Third Day of September, 2013

Teresa Stanek Rea
*Acting Director of the United States Patent and Trademark Office*